United States Patent
Ishikawa et al.

(10) Patent No.: US 7,029,194 B2
(45) Date of Patent: Apr. 18, 2006

(54) ONE-TOUCH CAP FOR FIXING A CONTROL CABLE

(75) Inventors: Takashi Ishikawa, Takarazuka (JP); Shinichi Yone, Wako (JP); Masaharu Ikawa, Wako (JP)

(73) Assignee: Nippon Cable System Inc., Tokyo (JP)

( * ) Notice: Subject to any disclaimer, the term of this patent is extended or adjusted under 35 U.S.C. 154(b) by 0 days.

(21) Appl. No.: 10/674,380

(22) Filed: Oct. 1, 2003

(65) Prior Publication Data

US 2004/0105720 A1    Jun. 3, 2004

(30) Foreign Application Priority Data

Oct. 2, 2002    (JP)    ............... 2002-289984

(51) Int. Cl.
 *F16B 9/00*    (2006.01)
(52) U.S. Cl. ............ 403/195; 403/193; 403/197; 403/397; 403/399; 74/502.4; 74/502.6
(58) Field of Classification Search ........ 403/192–195, 403/188, 197, 201, 374.1, 397–399; 74/473.14, 74/502.4, 502.6, 501.5 R; 248/65, 222.13, 248/225.11
See application file for complete search history.

(56) References Cited

U.S. PATENT DOCUMENTS

| | | | | |
|---|---|---|---|---|
| 3,366,356 A | * | 1/1968 | Fisher | ............... 248/56 |
| 5,347,882 A | | 9/1994 | Klotz | |
| 5,553,818 A | | 9/1996 | Wild | |
| 6,178,844 B1 | | 1/2001 | Burger | |
| 6,340,265 B1 | * | 1/2002 | Suzuki et al. | ............... 403/316 |
| 6,490,947 B1 | * | 12/2002 | Burger | ............... 74/502.4 |
| 6,634,252 B1 | * | 10/2003 | Mayville et al. | ............ 74/502.6 |

FOREIGN PATENT DOCUMENTS

| | | |
|---|---|---|
| DE | 195 28 953 | 2/1996 |
| EP | 0 239 984 | 4/1989 |
| EP | 0 365 243 | * 4/1990 |
| EP | 0 648 948 | 1/1994 |
| EP | 0 800 006 | 10/1997 |
| JP | 2000-087947 A1 | 3/2000 |
| JP | 2002-122271 A1 | 4/2002 |

* cited by examiner

*Primary Examiner*—Daniel P. Stodola
*Assistant Examiner*—Michael P. Ferguson
(74) *Attorney, Agent, or Firm*—Rader, Fishman & Grauer PLLC

(57) ABSTRACT

A one-touch cap (10) for fixing a control cable end to a bracket (14) provided with a U-shaped slot (15). The one-touch cap (10) has a cap (11) and a lock piece (12). The cap (11) has a tubular body (22) having a cable fixing part in its one end, a first flange (23) and a second flange (24) laid on the periphery of the body (22) at an interval and one pair of elastic pieces (25) between the both flanges. The lock piece (12) is a member to lock the bend of the elastic pieces (25). Each elastic piece (25) is connected to the bottom of the body (22), and has a knob (50) at the free end thereof. An engaging claw (51) for engaging with the first stepped latching part (56) of the bracket (14) is formed on the outer surface of the elastic piece (25). A hook block (52) to hook into the second stepped latching parts (57) is formed on the outer surface of each elastic piece (25).

4 Claims, 7 Drawing Sheets

Fig. 4a
Fig. 4b
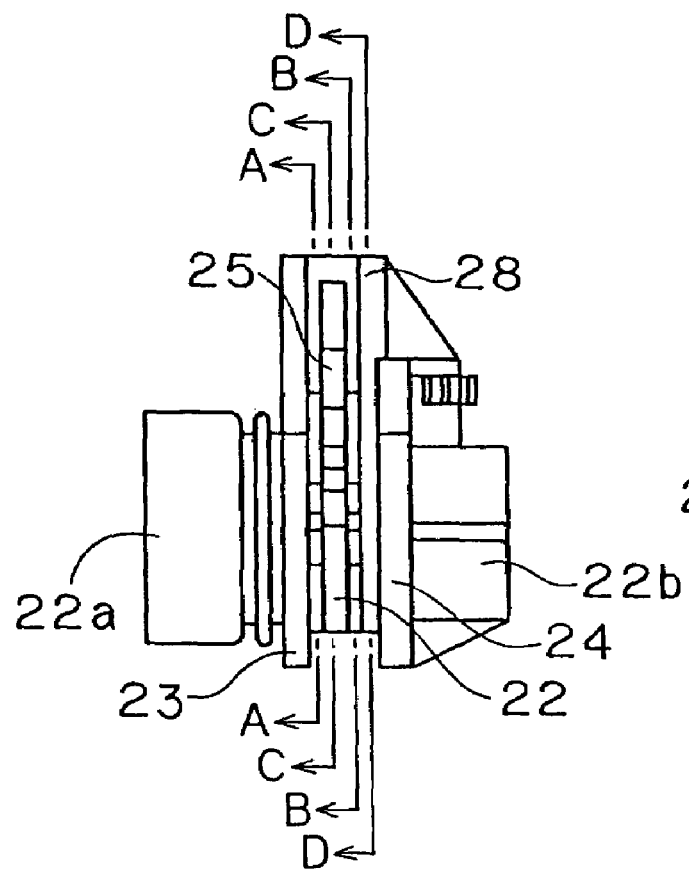
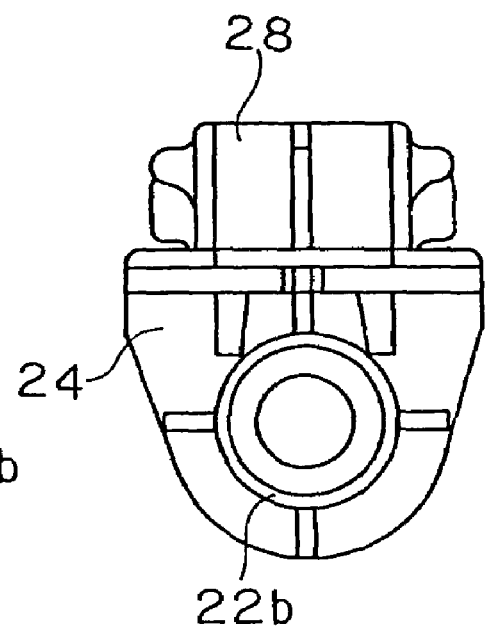

ONE-TOUCH CAP FOR FIXING A CONTROL CABLE

FIELD OF THE ART

The present invention generally relates to a one-touch cap for fixing or anchoring control cables, and more particularly, to a one-touch cap which is suitable for a structure for supporting a shift-lever-side end of a push-pull control cable used in automatic transmissions (hereinafter referred to as "AT cable").

BACKGROUND ART

[Document 1] Japanese Unexamined Patent Publication No.2002-122271

[Document 2] Japanese Unexamined Patent Publication No.2000-87947

[Document 3] U.S. Pat. No. 5,347,882

Generally, in the case of fixing the shift-lever-side end of an AT cable, as shown in FIG. 9b, a cable end fixing device 100 is used. In the device, the cable end is supported by a plate-like bracket which is provided with a U-shaped slot 101. In the cable end fixing device 100, a cable is mounted by being inserted sidewise into the slot 101 of the bracket 102, in other words, inserted along radial direction versus the axial line of the cable 103. As a cable end fixing device 100 of this type, the Document 1 proposes a one-touch cap which enables one-handed fixing of a cable and can support forces in the axial direction and can prevent from slipping out of the fixed cable.

This type device basically comprises, as shown in FIG. 9a, a body 107 provided with a flange-shaped stopper 105 for mating to one face of a bracket 102 and male screw thread 106, and a nut-like socket engaged with the male screw and energized by a coil spring 108 in the rotating direction. This device is semi-automated in screwing. Further, it has a lock member 111 so as to lock the rotation of the socket 109 before the cap is mounted on the bracket and released automatically when being mounted. In addition, it is proposed to make circular projection in the socket 109 to engage or disengage with the jaw portion 101a of the slot 101 using the motion along the axial direction of the socket 109, thereby securing the prevention of slipping out.

On the other hand, Document 2 proposes a cable fixing device 119 shown in FIG. 10. The device has a cable case 115 having a groove 114 to be engaged with the slot 101 of the bracket 102 and a leaf spring 118 having crooks 117 to be engaged as a snap fastener with mating groove 116 formed on the slot 101. The free ends 120 of the spring 118 are finger grips. It may be difficult to call this type as "one-touch cap", but once the spring 118 is mounted on the groove 114, the bracket 102 can be mounted by one hand on the bracket 102. In dismounting, only gripping the free ends 120 of the spring 118 releases the engagement with the mating groove 116 of the crooks 117 of the spring 118, thereby enabling easy dismounting. Further, a similar cable-fixing device is disclosed in Document 3.

The cable-fixing device 100 described in the Document 1 requires longer axial length so as to secure the operational range of the socket 109 and requires a coil spring 108 and the socket 109 resulting in more required parts and more complicated assembling work before fixing cables. On the other hand, the cable-fixing device described in the Document 2 requires fewer parts and the simple construction of the cable case 115. However, it requires pre-mounting of the spring 118 on the cable case 115 and also has a problem to be tended to become rickety. The object of the invention is to propose a one-touch cap having fewer parts and less tended to become rickety.

DISCLOSURE OF INVENTION

According to the present invention, there is provided a one-touch cap for fixing a control cable end to a plate-like bracket having a U-shaped slot inside of which is provide with a stepped latching part in detachable manner. The one-touch cap has (a) a tubular body having a cable fixing part for fixing a cable end, (b) a first flange to be engaged with one surface of the bracket and a second flange to be engaged with another surface of the bracket, the flanges being provided on the outer surface of the body with interval; and (c) an elastic piece provided between the first flange and the second flange. The elastic piece has a base portion connected to the bottom of the body, an outer surface having an engaging claw to be engaged with the stepped latching part of the bracket, and a free end extending upward.

In the above-mentioned one-touch cap, it is preferable that a guide part is provided between the first flange and the second flange and mates to the inside surface of the U-shaped slot, and the guide part is axially shifted from the elastic piece. Preferably, the bracket has a second stepped latching part; the elastic piece has a hook block in addition to the engaging claw located near the bottom thereof; the hook block is capable of engaging with the second stepped latching part; and an engaging of the hook block with the second latching part leaves some engaging even elastic piece is in the state of a elastic deformation where the engaging claw is been released. In addition, the one-touch cap preferably further comprises a lock piece detachably mounted between the elastic piece and the body.

In the one-touch cap of this invention, the body between both flanges is inserted into the U-shaped slot, so that the bracket is inserted between the first flange and the second flange. Therefore, movement of the cap along the axial direction is restrained by mating of both surfaces of the bracket and the first and second flanges. For example, when the inner core of the control cable is operated, a reaction force is applied to the conduit tube, and the mating of the first and second flanges supports the reaction force. Further, since the elastic piece elastically bends, the body is inserted into the slot once accompanying elastic deformation of the elastic piece, and then the engaging claw is engaged with the stepped latching part, thereby allowing secure engagement of the engaging claw with the stepped latching part through a recovery force of the elastic piece. This process prevents the body from slipping out of the U-shaped slot. In the above one-touch cap, when a pair of elastic pieces is provided in both sides of the body, the cable can be more securely held, because the right and left engaging claws engage with the right and left stepped latching parts respectively.

Unlike the conventional one-touch cap, the elastic piece in this invention does not require pre or separate assembling, because the elastic piece is continuously integrated with the body. Therefore, the cable can be attached in the bracket. And further, since the one-touch cap has fewer parts, the manufacturing and the parts management are easy. Further, in the case that a wrenching force to move the cable toward the opening of the slot is applied to the cable mounted in the bracket, a force is applied directly toward the opening of the bracket to the one-touch cap, since the first and the second flange are guided by both surfaces of the bracket. Therefore, a wrenching force is not applied to the elastic piece and can be securely held by the engaging claw. In addition, because the elastic piece is integrated with the body, there is almost no play in axial and radial direction.

In the one-touch cap described above, when a guide part for mating with inside surface of the U-shaped slot of the bracket, is provided between the first and the second flange, and the guide part is located with a shift in axial direction form the elastic piece, the guide function in mounting the one-touch cap to the bracket is exerted, thereby preventing misalignment in radial direction and turn. With this effect brought by the guide part, and the effects brought by the first and second flanges and the elastic piece, the one-touch cap can be more securely held both in axial and radial directions.

In the case that, the elastic piece has a hook block in addition to the engaging claw, the hook block is located near to the bottom of the elastic piece and engages with the second stepped latching part, and the engagement of the hook block with the second latching part leaves some engaging even elastic piece is in the state of a elastic deformation where the engaging claw is been released the engaging claw and the hook block collectively prevent the cable from slipping out, whereby enhancing the preventive function. Further, when an unpredictable external force is applied to the elastic piece to bend and the engaging claw is disengaged from the stepped latching part, there remains the engaging between the hook block and the second stepped latching part of the slot, preventing to slip out. When the external force is removed, the engaging claw engages with the stepped latching part again whereby holding the one-touch cap in the bracket securely.

In the case that one-touch cap has a lock piece detachably mounted between the elastic piece and the body when the lock piece is mounted between the elastic piece and the body, the elastic piece cannot bend toward such direction that the engaging function of the engaging claw is released. Resultantly, even if an unpredictable external force is applied, the engaging claw does not release its engagement with the stepped latching part, whereby preventing the one-touch cap from slipping out of the bracket. In this case, setting of a fitting area of the lock piece in the one-touch cap will allow easy handling, because the lock piece can be fitted to the one-touch cap while the lock piece is not inserted between the elastic piece and the body. Hereinafter, some embodiments of the invention is described with reference to accompanying drawings.

BRIEF DESCRIPTION OF THE ATTACHED DRAWINGS

FIG. 4a and FIG. 4b are a side view and a front view of the one-touch cap of FIG. 1 respectively;

BEST MODE FOR CARRYING OUT OF THE INVENTION

Figure 1:
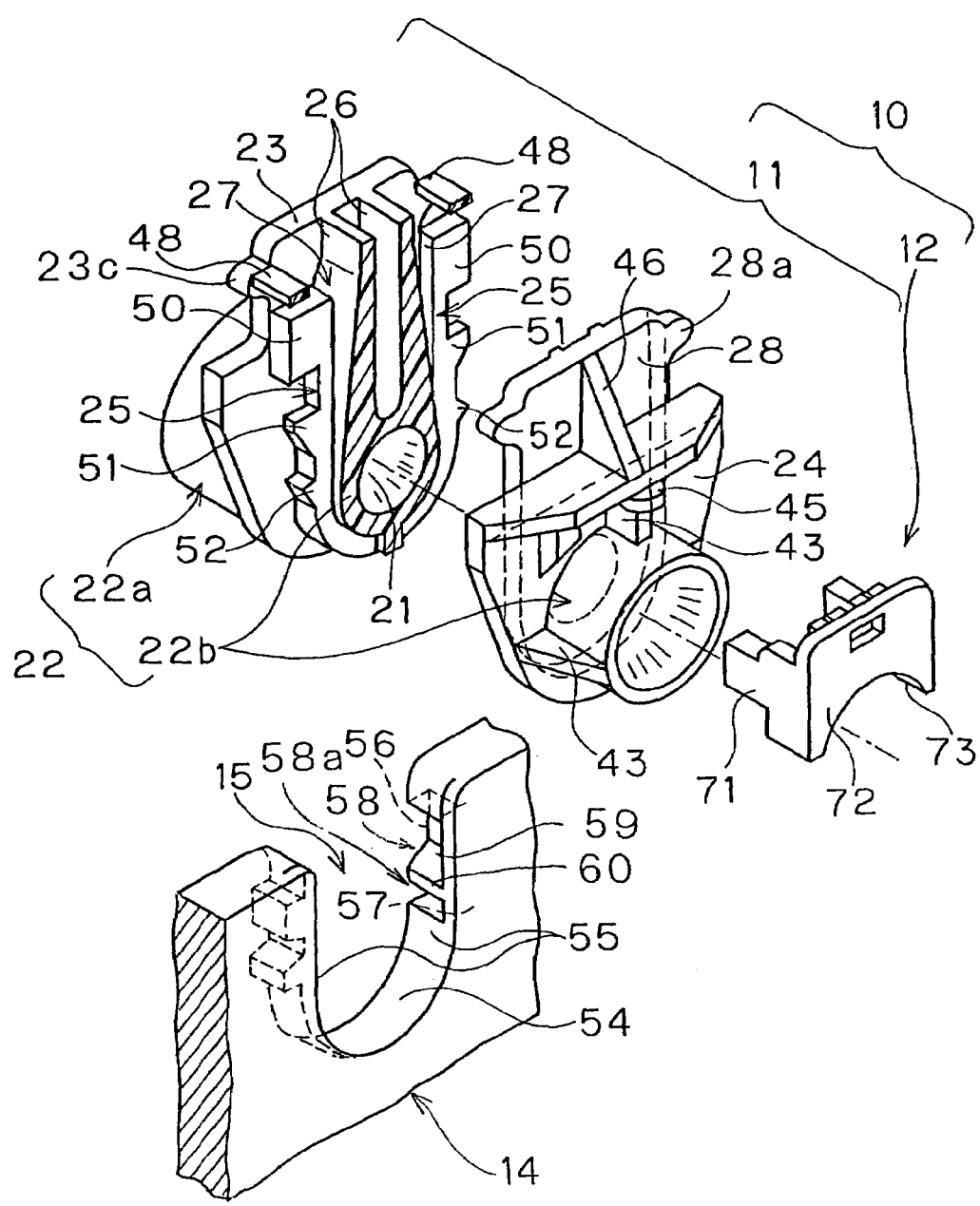
FIG. 1 is a perspective view with illustrated parts break down showing an embodiment of the one-touch cap of the invention.
Figure 2:
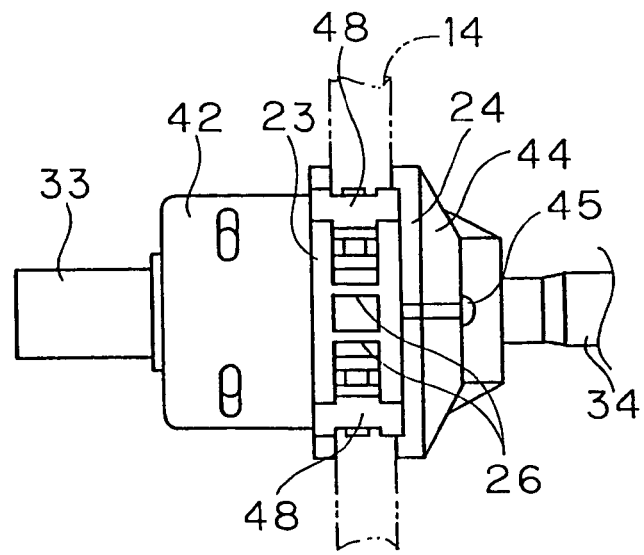
FIG. 2 and FIG. 3 are a plane view and a longitudinal section respectively, showing an embodiment of a cable fixing structure using each one-touch cap.

The one-touch cap 10 shown in FIG. 1 comprises a cap 11 and a lock piece 12 detachably mounted in the cap 11. The one-touch cap 10 is provided in order to mount a control cable 13 shown in FIG. 3 fixedly in the axially direction and detachably in a bracket 14 shown in down below FIG. 1. The lock piece 12 is not indispensable and can be omitted. In such case that the lock piece is omitted, the cap 11 itself becomes to a one-touch cap. In the description below, the cap 11 is often referred to as "one-touch cap". The bracket 14 is a plate-like member which has a U-shaped slot 15 and has various shapes in whole. In FIG. 1, the cap 11 is broken down in parts and laid before and behind to show the construction clearly. Practically, however, the cap 11 has one body in which front and rear portions are jointed integrally as shown in FIG. 2 and the like, and the cap 11 can be manufactured by integral molding using synthetic resin.

The cap 11 comprises a cylindrical or tubular body 22 having internal cavity 21 to pass through and hold a control cable and accessories, a plate-like first flange 23 and a plate-like second flange 24 provided on the front and rear of the body, and bar-like elastic pieces 25 connected to the bottom of the body 22 and extended upward over the upper end of the cylindrical portion of the body 22, with passing the side of the body 22. There is provided a pair of elastic pieces 25 symmetrically in right-and-left sides. In between the elastic pieces 25, an abutting piece or pieces 26 extended upward from the upper end of the cylindrical portion of the body 22. The abutting piece 26 is a stopper to restrain the bend when the elastic piece is elastically bent inward, and a gap 27 is provided between the outer surfaces of the abutting piece 26 and the inner surface of the elastic piece 25 (see FIG. 5c) when the elastic pieces 25 are not bent. The gap 27 is gradually enlarged according to go upward. In this embodiment, there is provided in the rear of the flange 24, a plane or plate-like guide 28 having a contour to mate the U-shape slot 15 of the bracket 14.

Figure 3:
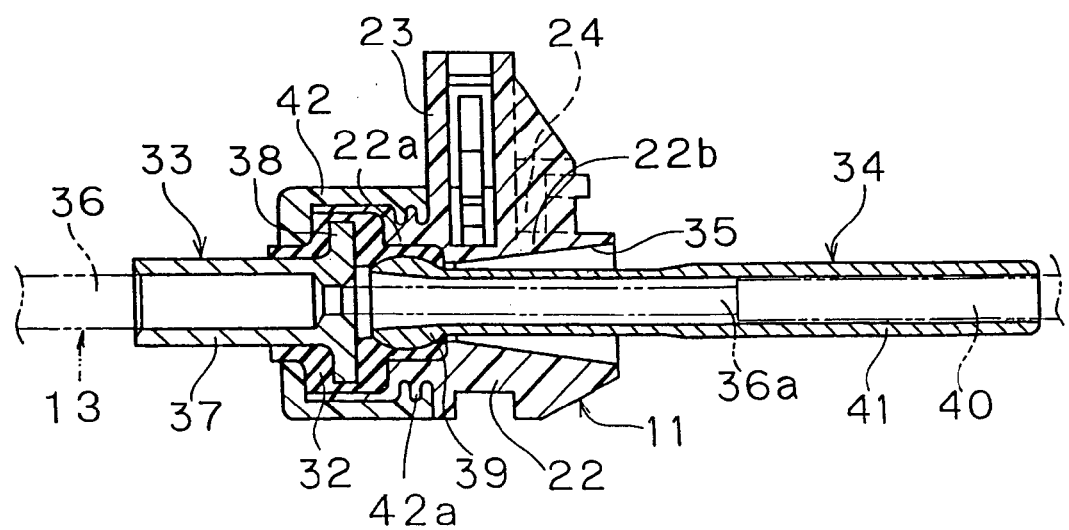

As shown in FIG. 3, the internal cavity 21 of the body 22 has a shape publicly known. More specifically, the back part 22a of the body 22 is a cable fixing part for accommodating a conduit holding member 33 intervened by a rubber vibration isolator 32, and the front part 22b of the body 22 is a part having a tapered inner surface 35 to restrain the swing angle of a guide pipe 34. As shown in FIG. 2 and FIG. 4a. The first flange 23 is located near the border of the back part 22a and the front part 22b, and the elastic pieces 25 and the second flange 24 are located at the upper part of the front part 22b. The portion between the first flange 23 and the second flange 24 on the body 22 is a part to be entered into the slot 15 of the bracket 14. The lower part of the body 22 has a shape of semi-cylinder surface to mate with an arc-shaped bottom of the slot 15 of the bracket 14, at an area in the axial direction where the elastic piece 25 is provided (see FIG. 5c) and where the guide 28 is provided (see FIG. 5d). At the part, between the first flange 23 and the elastic piece 25 (see FIG. 5a) and at the part between the elastic piece 25 and the guide 28 (see FIG. 5b) and at body is thinned and provided with a rib for abutting to the bottom of the slot.

The conduit holding member 33 shown in FIG. 3 has a tubular part 37 for caulking the end of the conduit 36 of a control cable 13 and a flange 38 engaged with and held by the rubber vibration isolator 32, and it is publicly known. The guide pipe 34 is, in its one end, provided with a spherical expanded part 39 connected to the cavity in the rubber vibration isolator 32 with providing a ball-and-socket coupling, and, at another end, provided with a cylinder 41 for holding a guide rod 40 in slidable manner freely in axial direction, and it is publicly known. At the root of the guide rod 40, an end of the inner core 36a emerging from the conduit tube 36 is fixed. Further, the periphery of the back part 22a and the rubber vibration isolator 32 are covered with a cup-like case 42, and its end is connected to mate to the engaging projection 42a formed on the periphery of the back part 22a.

Figure 5A:
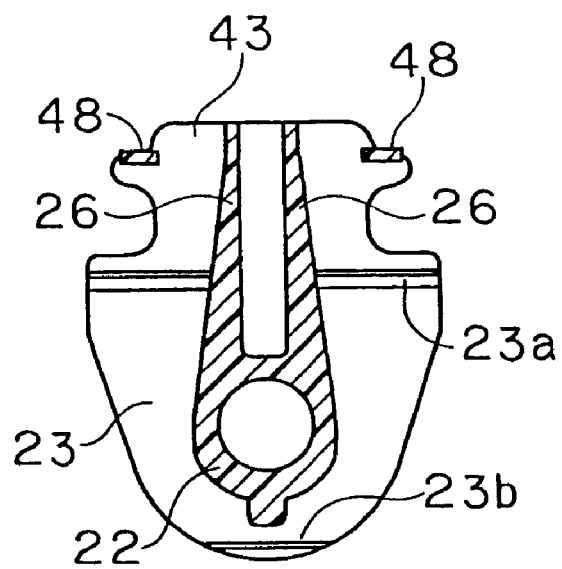
FIGS. 5a to 5d are a cross section along A—A, a cross section along B—B, a cross section along C—C, and a cross section along D—D respectively.

As shown in FIG. 5a, the lower part of the first flange 23 is of a semicircle-like shape, and its upper part is of inverted trapezoidal shape.

Further, in this embodiment, the rectangle projection 43 of the shape similar to the upper part of the guide 28 is formed on the upper part of the inverted trapezoidal shape. The left and right side peripheries of the projection 43 are notched so as to avoid obstruction in the operation of the elastic pieces with fingers. The reference numerals 23a and 23b denotes small projections to prevent the play due to the gap between the bracket and the flange.

The shape of the second flange 24 is, as shown in the FIG. 4b, is about the same as the first flange 23 except that it does not have the projection 43. That is to say, the second flange 24 has a semicircle lower part and an inverted trapezoidal upper part. Further, in this embodiment, as shown in FIG. 2, a pent roof part 44 is formed protruding forward from the upper end of the second flange 24, and under surface of the of the pent roof 44 there is provided a catch 45 to receive the lock piece 12 by snap coupling (see FIG. 7). The largeness or breadth of the first flange 23 and the second flange 24 is as wide as to mate with the periphery of the slot of the front and rear surface of the bracket when the one-touch cap is mounted on the bracket 14. For that reason, they are protruding in lower and lateral directions than the body 22 which is located in between both flanges 23,24.

As shown in FIG. 1, on the upper end of the first flange 23, remaining of the notched part described above is formed as one pair of projection 23c protruding right and left. Near the upper end of the guide part 28, one pair of the projection 28a is formed protruding right and left. The left projection 23c, 28a each other and right projection 23c, 28a each other are coupled by the coupling piece 48. The coupling piece 48 has a reinforcement function and otherwise a protecting function by covering the upper end of the elastic piece 25 so that an unpredictable external force is not applied to the elastic pieces 25. The left and right projections 23c, 28a serve as finger holds when the one-touch cap 10 is removed from the bracket 14 by pinching the knobs 50 of the elastic piece 25.

Figure 5B:
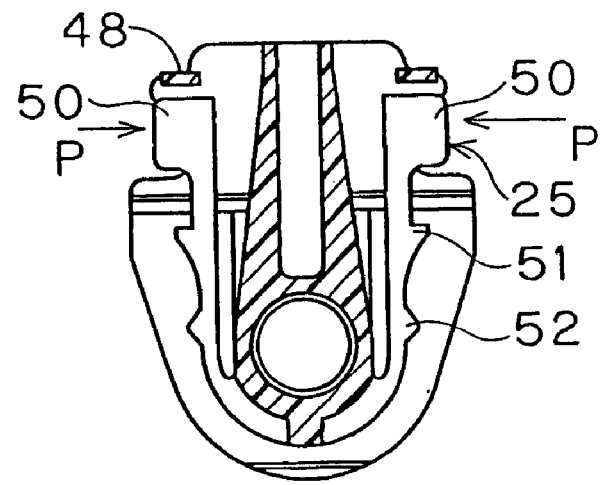
Figure 5C:
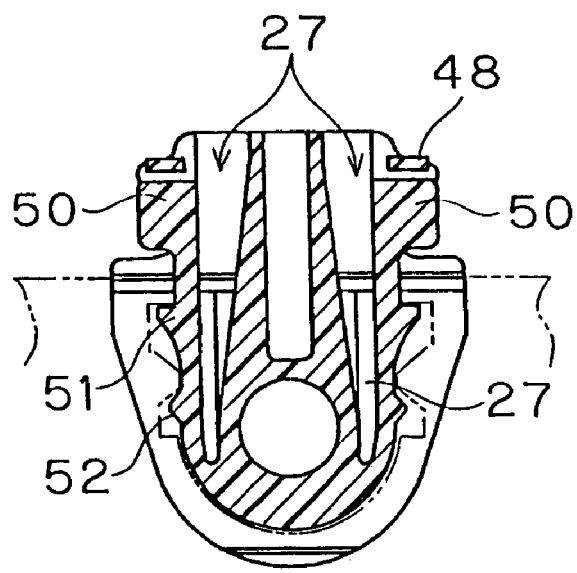

The pair of the elastic pieces 25 has, as shown in FIG. 5b and FIG. 5c in full details, the knob 50 protruding outward on its upper end. Pinching of the knob 50 allows the elastic pieces 25 to bend inward (toward the arrowhead P) (see FIG. 6). At the down side of the knob 50, the engaging claw 51 protrudes outward. The engaging claw 51 has a triangle shape and is about perpendicular to the direction of inserting the bracket 14 into the slot 15 so as to be engaged at its upper edge. The lower edge is inclined to bend the elastic piece 25 when it is inserted into the slot 15. The elastic piece 25 serves to hold the engaging claw 51 of the elastic piece 25 when the one-touch cap 10 is mounted in the bracket 14 by engaging the engaging claw 51 of the elastic piece 25 with the stepped latching part of the bracket 14.

Further in this embodiment, near the root of the elastic piece 25 is provided with a hook block 52 protruding outside. The height of this hook block 52 is laid down as follows; When the knob 50 is pinched to bend the elastic piece 25 inward and the engaging claw 51 becomes about to depart from the stepped latching part of the bracket 14, the head of the hook block 52 does not depart completely from the second stepped latching part 57; When the knob 50 is pinched and the one-touch cap 10 is pulled upward to bend the elastic piece 25 furthermore inward, the hook block 52 departs from the second stepped latching part 57 completely. Therefore, when an unpredictable external force is applied to the elastic piece 25, one-touch cap 10 does not slip out from the bracket 14, while it can be easily pulled out intentionally.

Figure 5D:
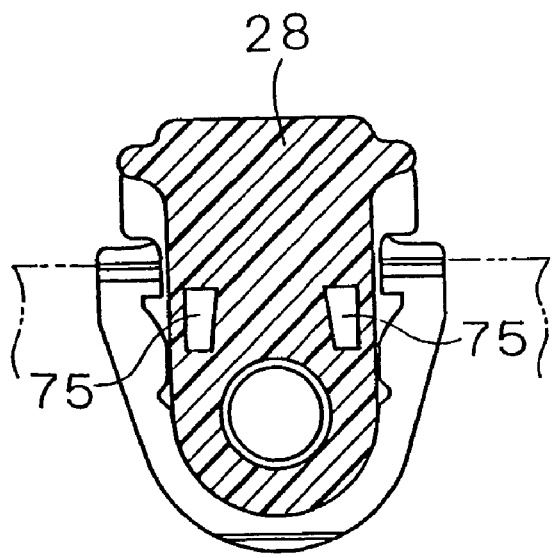

The guide part 28 is a part to mate with the U-shaped slot 15 of the bracket 14 and, as shown in FIG. 5d, the lower part is of the shape of semicircle and the left and right sides are parallel each other. The upper part is of the same shape as the projection 43 of the first flange 23 and holds an end of the pair of coupling pieces 48. The guild part 28 serves as guide to make straight up and down of the one-touch cap 10 when it is mounted to and removed from the bracket 14, and it also serves to resist an external force in lateral directions, downward direction or inclining direction to the axial center being applied to the cables or one-touch cap in mounting. Thus the guide part 28 tempers the applied external forces to the elastic piece 25 and prevents slipping out from the bracket 14.

Next, the bracket 14 is described in reference to FIG. 1. The bracket 14 is like a plate having substantially the same thickness as the gap between the first flange 23 and the second flange 24 of the one-touch cap 10 and the U-shaped slot 15 is formed in it. The slot 15 is of the shape of semicircle in its bottom 54, and the left and right sides are parallel plane. The upper end of the slot 15 is opened at the upper edge of the bracket 14. On the upper end outlet of the slot 15, curved surfaces or tapered surfaces are formed to ease the insertion of the one-touch cap 10. Further in this embodiment, on the left and right side 55 of the slot 15, the first stepped latching part 56 for engaging with the engaging claw 51 of the one-touch cap 10 and the second stepped latching part 57 for engaging with the hook block 52 are formed. The stepped part 56 and 57 are composed of the upper surface of recessed parts 58 and 58a formed on the first flange side of the side 55, which are thinner than the board thickness. There is no recessed part in the part contacting the guides 28 of the left and the right sides 55, and it is flat and U-shaped securing higher guiding effect of the guide part 28.

Figure 6:
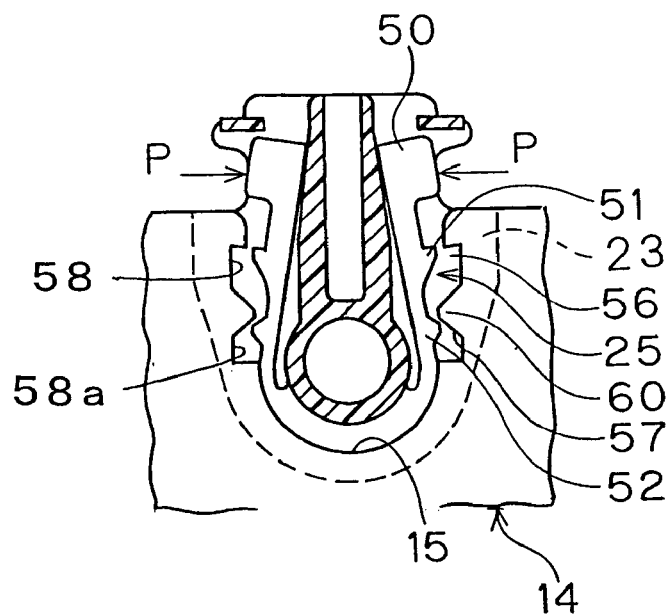
FIG. 6 is a cross section showing the condition removing the one-touch cap from the bracket.

As shown in FIG. 6 in detail, the first stepped latching part 56 is a inclined plane ascending as it enters inside (descending at its free end), thereby securing the engagement with the engaging claw 51. The under surface 59 of the upper recessed part 58, namely the upper surface of the triangle projection 60 composing the second stepped latching part 57 is formed to be a descending plane at its free end side so a to push the hook block 52 inward when the one-touch cap 10 is inserted. Each second stepped latching part 57 composed of the under surface of the projection 60 is formed to be an ascending plane at its free end side. Therefore, when the one-touch cap 10 is pulled out from the bracket 14, as described above, the hook blocks 52 are pushed inward to release the engagement with the second stepped latching parts 57, allowing the one-touch cap 10 to be pulled out.

Next, the procedure for fixing of a control cable to the bracket is described using the one-touch cap 10 of FIG. 1. The conduit tube of the control cable is fixed to the conduit holding member 33 by caulking, and the one end of the guide pipe 34 is mounted in the rubber vibration isolator 32, and then the whole body is accommodated in the vacant space of the back part 22a in the body of the one-touch cap 10 and is covered with the case 42. The inner core 36a is dragged out from the front end of the guide pipe 34 and fixed to the end of a guide rod 40, thereby completing the preparation in the one-touch cap 10 side. The obtained assembly of one-touch cap and the cable is located upward to align in the center of the bracket 14. And then the gap between the flanges 23, 24 of the one-touch cap 10 is positioned so as to adjust with the bracket 14, and is inserted into the slot 15.

In this condition, since the inclined planes of the engaging claws 51 and the hook blocks 52 mates with the inclined planes of the inlet of the slot 15 and the triangular projection 60, the elastic pieces 25 bend naturally inward around the bottom thereof. Therefore, it, is not necessary to grasp the knob 50. When the engaging claws 51 climb over the first stepped latching parts and the hook blocks climb over the second stepped latching parts, the elastic pieces 25 recovers to original condition by elasticity, thereby allowing the engagement of the engaging claw 51 and the first stepped latching part achieving the prevention of slipping out the cable. In this condition, because the first flange 23 and the second flange 24 shuts or sandwiched in the bracket 14, the motion in axial direction is restrained.

The one-touch cap 10 once mounted on the bracket 14 can be departed, as shown in FIG. 6, by grasping the knobs 50 of the elastic pieces 25 and bending toward the allow P to disengage the engaging claws 51 from the first stepped latching parts 56. The hook blocks 52 are about to depart from the second stepped latching parts 57. In this condition, for example, hooking the projection 23c and 28a by finger and pulling up the one-touch cap 10 allows further bending of the elastic piece to disengage the hook blocks 52 from the second stepped latching parts 57 departing the one-touch cap 10 from the bracket 14.

As described above, it is possible to mount the one-touch cap 10 to the bracket 14 securely without use of the lock piece. However, when an unpredictable strong force is applied to the cable or to the one-touch cap 10, particularly an upward force directed to the opening of the slot 15 is applied in an oblique direction, the elastic pieces 25 are elastically bent and the one-touch cap 10 may slip out from the slot 15. On that account, in the one-touch cap 10 in FIG. 1 a composition is employed to insert a lock piece 12 in the gaps between the elastic pieces 25 and the abutting piece 26. The lock piece 12 is, as shown in FIG. 1 and FIG. 8, provided with one pair of leg parts (inserting pieces) 71 to be inserted in the gaps between the elastic pieces 25 and the abutting piece 26, a front wall 72 connecting the pair of leg parts and a sliding part 73 of circular arc cross section for sliding back and forth on the upper surface of the front part 22b of the body 11 of the cap 10.

Figure 7:
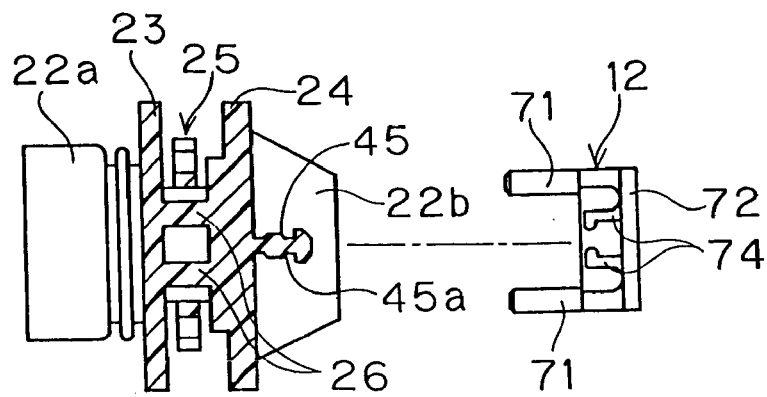
FIG. 7 is a partial cross sectional plan view of the one-touch cap of FIG. 1.
Figure 8:
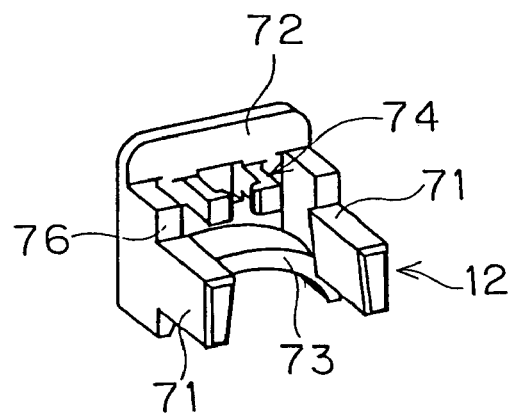
FIG. 8 is a back side perspective view or the lock piece shown in FIG. 1.
Figure 9A:
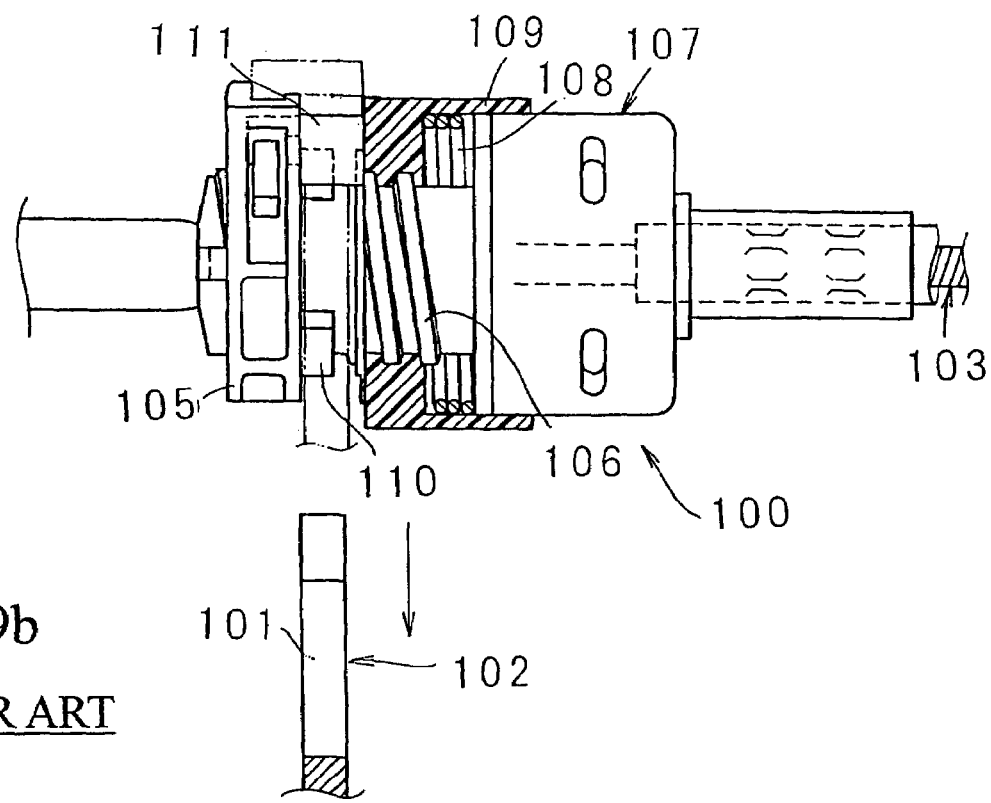
FIGS. 9a and 9b are a partial cross sectional side view and the partial cross sectional front view showing an embodiment of the conventional cable fixing means.
Figure 9B:
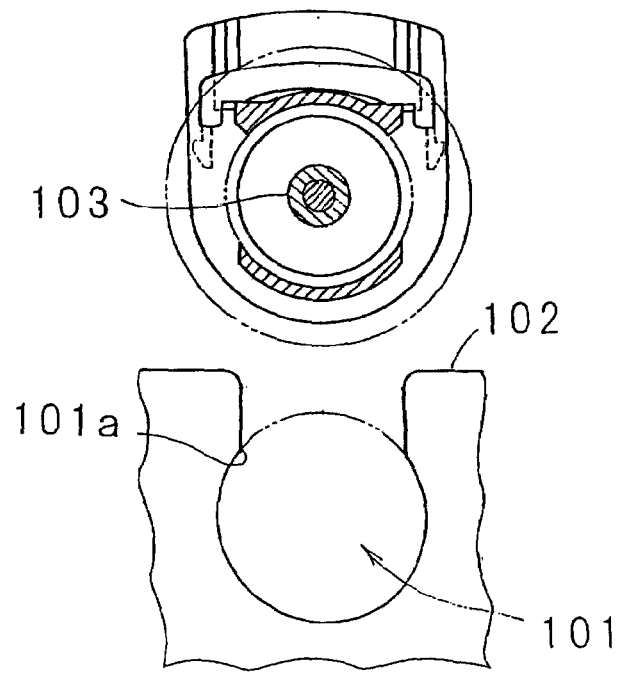
Figure 10:
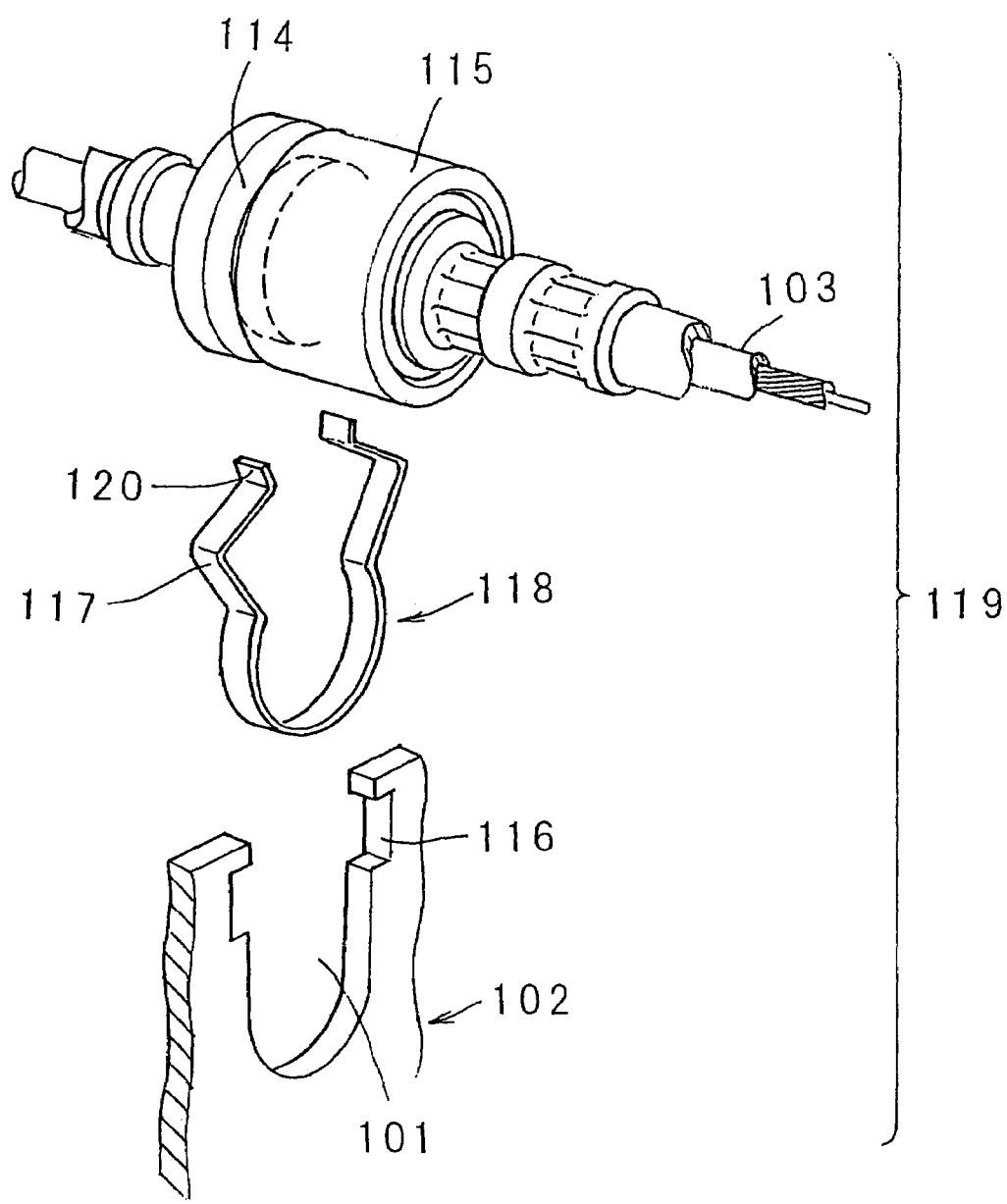
FIG. 10 is a perspective view showing the other embodiment of the conventional cable fixing device.

Further, as shown in FIG. 7 and FIG. 8, there is provided snap projections 74 to make snap coupling with a catch (reference numeral 45 in FIG. 7) on the rear surface of the front wall 72. The snap projections are so made that elastic tongue pieces of L-shaped in plane view are faced each other and their key part of the front edges are engaged with the concaved parts 45a of the catch 45. The cross section of the leg part 71 is tapered to be thin in the under side so as to match the shape of the gap 27 between the elastic pieces 25 and the abutting piece 26. As shown in FIG. 4b and FIG. 5d, through holes 75 to pass and hold the leg parts 71 are formed from the second flange 24 to the guide part 28. The through holes 75 hold the leg parts 71 to be free in sliding. However, the fitting tolerance may be set as that of transitional fit. The roots of the leg part 71 are made higher than the front edge and are provided with a stepped part 76 not to get into the through holes 75.

In the normal condition, the front ends of the leg parts come to a stop abutting with the through holes 75 and holds the lock piece 12. Then, after the one-touch cap 10 is mounted in the bracket 14, the front wall 72 is pushed to make the leg parts 71 to mate deeply so that the front end gets into the gap 27 between the elastic piece 25 and the abutting piece 26, thereby preventing the elastic piece 25 to be bent to the center side. Resultantly, the elastic piece 25 is prevented from being bent by unpredictable external force, and the one-touch cap 10 is prevented from slipping out.

When the cable 13 and the one-touch cap 10 are removed from the bracket 14, at first the front wall 72 is pulled to draw out the lock piece 12 halfway, then the front ends of the leg parts 71 are pulled out from the gaps between the elastic pieces 25 and the abutting piece 26. Thus, by manipulating the knobs 50, the elastic pieces 525 are easily elastically bent. After that, by the same procedure describe above, they are removed from the bracket 14.

Although the lock piece 12 strongly prevents the slipping out, it needs additional manipulations in mounting and dismounting of the one-touch cap 10 on the bracket 14 reducing the merit of one-touch cap to be demountable easily. Therefore, it is preferable to employ the lock piece 12 in the case that application of strong external forces is foreseen, and it can be omitted in the opposite case. There is about the same tendency in the case that the hook blocks 52 provided in the elastic pieces 25 and the second stepped latching parts 57 provided in the bracket 14. It is preferable to employ them in the case that a certain level of external forces is applied. In the opposite case, the hook block 52 and the second stepped latching part 57 can be omitted.

In the embodiment described above, the cap 11 is a molded component made of synthetic resin, but a component made of metal can be used. However, it is preferable to use the component made of synthetic resin, because, in the later case, more than two parts must be used; for example, a spring is used as the elastic piece. Though the bracket is usually made of synthetic resin, it can be made of metal.

What is claimed is:

1. A one-touch cap for fixing a control cable end to a plate-like bracket having a first outer surface and a second outer surface disposed opposite and extending parallel to the first outer surface and a U-shaped slot inside of which is provided with a stepped latching part in a detachable manner, said one-touch cap comprising:

(a) a tubular body having a cable fixing part for fixing a cable end and an internal cavity extending along a longitudinal axis;

(b) a first flange having a first flange inner surface and a second flange having a second flange inner surface disposed apart from and facing the first flange inner surface, the first flange inner surface disposed in a first plane and the second flange inner surface disposed in a second plane spaced apart from the first plane in a parallel manner to define an interval between the first and second planes, respective ones of the first and second flange inner surfaces engaged in facial contact with respective ones of the first and second outer surfaces of the bracket; and (c) an elastic piece being provided between the first and second flanges and disposed in its entirety within the interval; and having a base portion connected to a bottom of the tubular body below the longitudinal axis, an outer surface provided with an engaging claw disposed above the longitudinal axis to be engaged with the stepped latching part of the bracket, and a free end extending upward above the longitudinal axis with the engaging claw positioned between the base portion and the free end.

2. A one-touch cap according to claim 1, further comprising;

a guide part provided between the first flange and the second flange and mating with an inside surface of the U-shaped slot, wherein the guide part is axially shifted from the elastic piece.

3. A one-touch cap according to claim 1, wherein, the bracket has a second stepped latching part;

the elastic piece has a hook block in addition to the engaging claw;

the hook block is located near the bottom of the elastic piece and is capable of engaging with the second stepped latching part; and the hook block and the second latching part remains weakly engaged even when the elastic piece is deformed for release.

4. A one-touch cap according to claim 1, further comprising a lock piece detachably inserted between the elastic piece and the body.

* * * * *

UNITED STATES PATENT AND TRADEMARK OFFICE
CERTIFICATE OF CORRECTION

PATENT NO. : 7,029,194 B2
APPLICATION NO. : 10/674380
DATED : April 18, 2006
INVENTOR(S) : Takashi Ishikawa et al.

Page 1 of 1

It is certified that error appears in the above-identified patent and that said Letters Patent is hereby corrected as shown below:

Title Page, item [73] Assignee should read

--Nippon Cable System Inc., Tokyo (JP)
Honda Giken Kogyo Kabushiki Kaisha, Tokyo (JP)--

Signed and Sealed this

Sixteenth Day of January, 2007

JON W. DUDAS
*Director of the United States Patent and Trademark Office*